United States Patent

Nishio et al.

[11] Patent Number: 5,938,563
[45] Date of Patent: Aug. 17, 1999

[54] SHIFT CONTROL APPARATUS OF AUTOMATIC TRANSMISSION

[75] Inventors: Motoharu Nishio, Yokohama; Takashi Murasugi, Shizuoka; Hiromasa Sakai, Kanagawa, all of Japan

[73] Assignee: Nissan Motor Co., Ltd., Yokohama, Japan

[21] Appl. No.: 09/025,256

[22] Filed: Feb. 18, 1998

[30] Foreign Application Priority Data

Feb. 18, 1997 [JP] Japan .................................. 9-033554

[51] Int. Cl.⁶ .................................................. F16H 61/08
[52] U.S. Cl. .......................................... 477/117; 475/120
[58] Field of Search ............................ 477/117; 475/117, 475/120, 128

[56] References Cited

U.S. PATENT DOCUMENTS

| | | | |
|---|---|---|---|
| 4,957,015 | 9/1990 | Ishikawa et al. | 74/335 |
| 4,982,622 | 1/1991 | Yamamoto et al. | 74/866 |
| 5,094,128 | 3/1992 | Kamada | 74/866 |
| 5,797,821 | 8/1998 | Fujimoto et al. | 475/120 |
| 5,807,207 | 9/1998 | Hisano et al. | 477/116 |

FOREIGN PATENT DOCUMENTS 5-332436 12/1993 Japan .

OTHER PUBLICATIONS

Extraction of "Service Manual of Automatic Transmission Of Type RE4R01A" published by Nissa Motor Co., Ltd., 1987, pp. 1–5–1–8.

*Primary Examiner*—Dirk Wright
*Attorney, Agent, or Firm*—Foley & Lardner

[57] ABSTRACT

A shift control apparatus of an automatic transmission executes a transient control of an engagement pressure of a first speed selecting friction element when a first speed is selected after a higher speed is once selected during a change from a neutral range to a forward drive range. A band brake pressure for selecting the second speed is rapidly increased at a first moment. A forward clutch pressure for selecting the first speed is increased at a second moment delaying to the first moment by a predetermined period adjusted to a line pressure lowered period. The forward clutch pressure is pre-charged during a period between the first and second moments, then being hold for a preset time period at a return spring corresponding pressure adjusted by a leaning control, and being increased by a slope adjusted by the leaning control for a predetermined period to establish the second speed by the engagement of the forward clutch. Then, the band brake pressure is rapidly decreased and further decreased by a slope to disengage the band brake in order to establish the first speed.

13 Claims, 6 Drawing Sheets

FIG.2

| SHIFT POSITION | FRICTION ELEMENT | | | | | |
|---|---|---|---|---|---|---|
| | F/C | H/C | B/B | LR/B | L/OWC | R/C |
| 1ST SPEED | ○ | × | × | (○) | ○ | × |
| 2ND SPEED | ○ | × | ○ | × | × | × |
| 3RD SPEED | ○ | ○ | × | × | × | × |
| 4TH SPEED | × | ○ | ○ | × | × | × |
| REVERSE | × | × | × | ○ | × | ○ |

SHIFT CONTROL APPARATUS OF AUTOMATIC TRANSMISSION

The contents of Application No. 9-33554, with a filing date Feb. 18, 1997 in Japa, are hereby incorporated by reference.

BACKGROUND OF THE INVENTION

The present invention relates to improvements in a shift control apparatus of an automatic transmission, and more particularly to a shift control apparatus which enables a shift change from a neutral range to a forward shift speed range to be executed smoothly.

Generally, when a forward range of a manual valve is selected, an automatic transmission transfers a driver power from an input shaft to an output shaft by determining a power transmission passage of a gear transmission system through a selective engagement of friction elements such as a plurality clutches and brakes, and executes a shift change by changing the engaged condition of the friction elements. When a neutral range of the manual valve is selected, all of the friction elements are disengaged to put the automatic transmission in a neutral condition in which the drive power is not transferred from the input shaft to the output shafts. The automatic transmission set in the forward range executes an automatic shift change according to a vehicle traveling condition such as an engine load and a vehicle speed. Accordingly, when the shift range is changed from the neutral range to the forward range, a first speed gear of the forward range is selected to start the vehicle. However, such a shift change from the neutral range to the first speed gear of the forward range tends to generate vibrations or sink-down of the vehicle so-called a squat due to the radical raising up of the output shaft torque.

A Japanese Patent Provisional Publication No. 5-332436 discloses a shift control apparatus which is arranged to prevent the generation of the vibrations or squat of a vehicle. This conventional shift control apparatus is arranged to prevent a radical increase of the output shaft torque by once selecting a higher speed gear before selecting a first speed gear of the forward range. More particularly, working pressure is first supplied to a friction element for selecting a higher speed gear and is then supplied to a friction element for selecting a first speed gear while being discharged from the friction element for selecting the higher gear. A working pressure circuit for each friction element is respectively constituted by an accumulator, an orifice, a bent passage which are inherent by each circuit. Accordingly, it is not certain that the engagement and disengagement of the friction elements are executed by a predetermined procedure during the supply and discharge of the working pressure. This may generate striking noises between gears and shocks due to the engagement of the friction element for selecting the first speed gear preceding to the engagement of the friction element of the higher speed gear. In order to avoid such problems, this conventional shift control apparatus is arranged such that when a higher speed gear is selected preceding to the first speed gear, one of the friction elements for selecting the first speed gear or higher speed gear which one does not execute the transmission of the driving power is engaged, and the higher speed gear is then selected by the engagement of the friction element for selecting the first speed gear is engaged, and then the first speed gear is selected by disengaging the friction element for selecting the higher speed gear.

However, since it is necessary to quickly execute the supply of the working pressure to the higher speed gear friction element which was put in an empty condition in case of the change from the neutral range to the forward range, an oil pump consumes a lot of working oil and therefore the line pressure is temporally decreased. Although the temporal decrease of the line pressure does not cause a trouble in the supply process of the working pressure to the friction element of the higher speed gear, it causes shift shocks or squat in the supply process of the working pressure to the friction element for selecting the first speed gear if a fine pressure control is not executed. That is, since the friction element for the higher speed gear does not function independently to execute the power transmission, even if the supply of the working pressure is quickly executed, no trouble causes. Accordingly, even in a temporally lowered pressure condition such supply of the working pressure for selecting the higher speed gear is normally executed. In contrast, the engagement of the friction element of the first speed gear generates the power transmission. Therefore, it is necessary to finely execute the supply of the working pressure so as not to generate the engagement shocks and squat. That is the execution of the supply of the working pressure under the pressure temporally lowered condition generates the engagement shocks and the squat. Such troubles are significantly caused by the decrease of the discharge amount of an oil pump driven by the engine and by the decrease of the discharge amount of the pump. Further, since the circulation efficiency of the Working oil is degraded by the increase of the temperature of the working oil of the automatic transmission due to the increase of the leakage of the working oil from the oil pump, the troubles become significant according to the increase of the working oil temperature.

On the other hand, although the fine control under the pressure temporally lowered condition is ensured by means of the orifice and accumulator as mentioned in the prior art, such control increases the time period for selecting the first gear. This may generate a new trouble such as the degradation of a responsibility for starting the vehicle.

SUMMARY OF THE INVENTION

It is an object of the present invention to provide an improved shift control apparatus which is arranged to prohibit the engagement of a friction element for selecting a first speed during a condition that a line pressure is temporally lowered while keeping the line pressure lowered time short.

A shift control apparatus according to the present invention is used in an automatic transmission which establishes a plurality of shift speed gear by selectively engaging a plurality of friction elements. The shift control apparatus comprises a first speed gear selecting section and an engagement prohibiting section. The first speed gear selecting section selects a first speed gear after selecting a higher speed gear when a shift rage of the automatic transmission is changed from a neutral range in which all friction elements are disengaged to a forward range in which one of the plurality of speed gears is selectable. The first speed gear selecting section executes the section of the first speed gear in such a manner that first the friction element, which relates to select the higher speed gear and does not execute the transmission of drive power of an engine independently, is engaged, second the friction element, which relates to select the first speed gear, and third the friction element which relates to select the higher speed gear, is disengaged. The engagement prohibiting section prohibits the engagement of the friction element for selecting the first speed gear for a predetermined prohibiting time period from the moment when the shift range is changed from the neutral range to the forward range to the moment.

BRIEF DESCRIPTION OF THE DRAWINGS

FIG. 2 is a table showing an engagement theory of friction elements of the automatic transmission.

DETAILED DESCRIPTION OF THE INVENTION

Referring to FIGS. 1 to 7, there is showed an embodiment of a shift control apparatus of an automatic transmission for an automotive vehicle according to the present invention.

Figure 1:
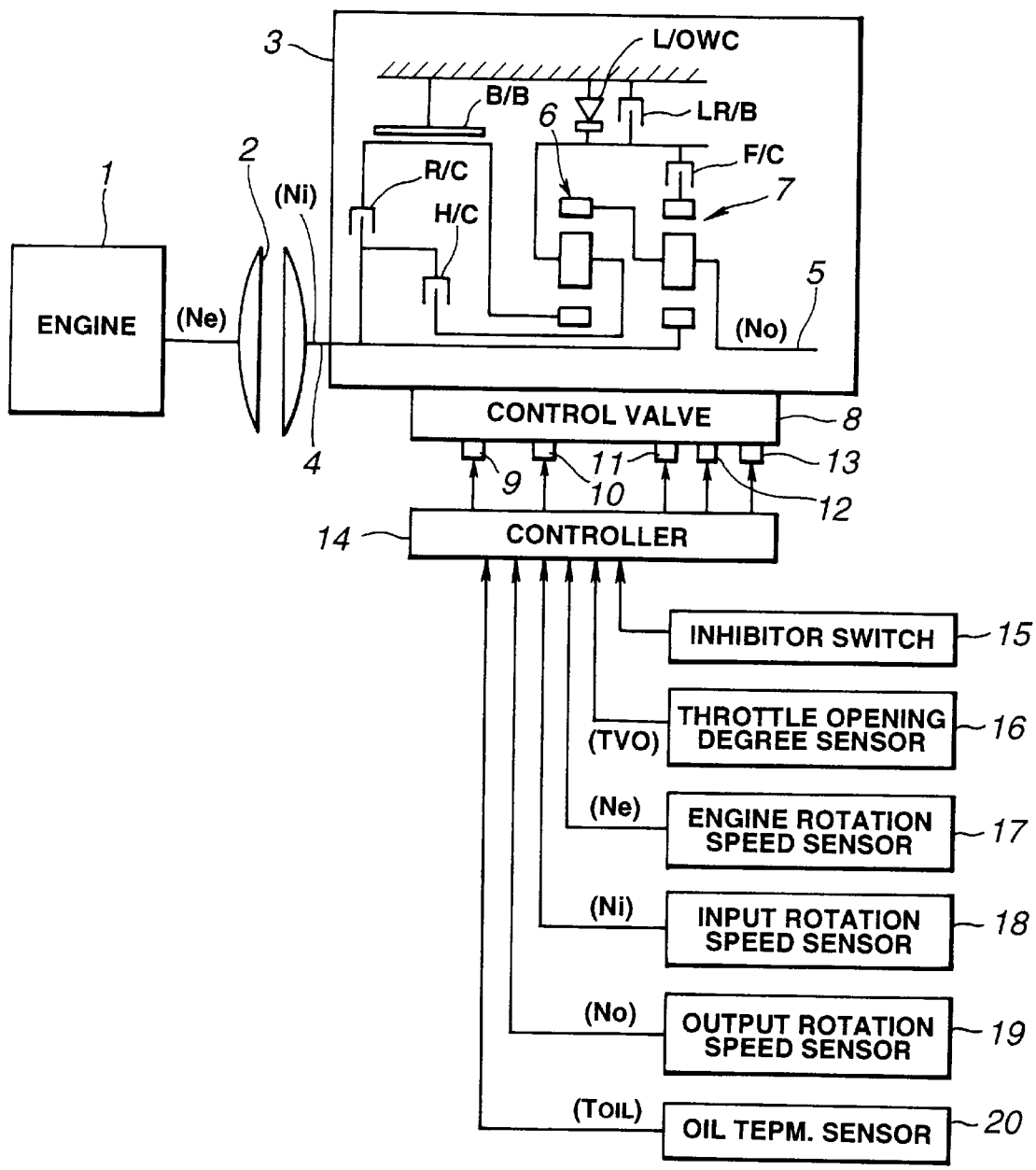
FIG. 1 is a schematic view showing a shift control system of an automatic transmission including a shift control apparatus according to the present invention.

As shown in FIG. 1, an automatic transmission 3 including a shift control apparatus according to the present invention is connected to an engine 1 through a torque converter 2. That is, driving power of the engine 2 is transferred to an input shaft 4 of the automatic transmission 3 through the torque converter 2. The mechanical structure of the automatic transmission 3 is basically similar to an automatic transmission shown in a Publication "Service Manual of Automatic Transmission of Type RE4R01A" published by Nissan Motor Company Limited. The automatic transmission 3 comprises an input shaft 4 and an output shaft 5 which are coaxially arranged in tandem. A front planetary gear set 6 and a rear planetary gear set 7 are arranged around the input and output shafts 4 and 5. Further, the automatic transmission 3 comprises a forward clutch F/C, a high clutch H/C, a band brake B/B, a low reverse brake LR/B, a low one-way clutch L/OWC and a reverse clutch R/C. These friction elements are selectively engaged so as to establish one of first, second, third and fourth speed gears and a reverse gear, as shown in Table of FIG. 2. The mark (0) as to the low reverse brake LR/B means to engage the low reverse brake LR/B for activating an engine brake in the first speed gear.

The automatic transmission 3 comprises a control valve 8 which includes a forward-clutch duty solenoid 9, a high-clutch duty solenoid 10, a band-brake duty solenoid 11, a low-reverse-brake duty solenoid 12 and a reverse-clutch duty solenoid 13. By respectively controlling duty ratios of these duty solenoids 9 to 13, the engagement theory shown in Table of FIG. 2 is achieved and the hydraulic pressures to the friction elements are transiently controlled during a shift control.

A controller 14 of the automatic transmission 3 executes a duty control of each of the duty solenoids 9 to 13. The controller 14 is electrically connected to an inhibitor switch 15 for detecting a selected shift range, a throttle opening degree sensor 16 for detecting a throttle opening degree TVO of the engine 1, an engine rotation speed sensor 17 for detecting an engine rotation speed $N_e$, an input rotation speed sensor 18 for detecting an input rotation speed $N_i$ of the input shaft 4, an output rotation speed sensor 19 for detecting an output rotation speed $N_o$ of the output shaft 5, and an oil temperature sensor 20 for detecting an oil temperature $T_{OIL}$ Of the automatic transmission 3. The controller 14 receives signals from the above-mentioned sensors 15 to 20 and executes the shift control of the automatic transmission 3.

First, the controller 14 reads the throttle opening degree TVO and the output rotation speed No from the sensors 16 and 19 and calculates a vehicle speed. Then, on the basis of the calculated vehicle speed and the throttle opening degree TVO, the controller 14 determines a shift speed gear suitable for a present driving condition from a prepared shift speed pattern. When a now set shift speed gear does not correspond to the determined shift speed gear, the controller 14 outputs a shift command to achieve (establish) the determined shift speed gear by operating the control valve 8.

In this embodiment, when the shift position is changed from a neutral position (N-range) to a drive (forward) range (D-range), a second speed gear is established by the engagement of the forward clutch F/C and the band brake B/B, then a first speed gear is established by the engagement of the forward clutch F/C. Therefore, the forward clutch F/C corresponds to a first speed gear selecting friction element, and the band brake B/B corresponds to a high speed gear selecting friction element. As is well known, when the neutral range is selected, all of the friction elements are disengaged so as not to transfer the power of the engine 1 from the input shaft 4 to the output shaft 5. When the drive range (forward range) is selected, the automatic transmission 3 selects one of the first to fourth speed gears according to the driving condition as mentioned above.

Figure 3:
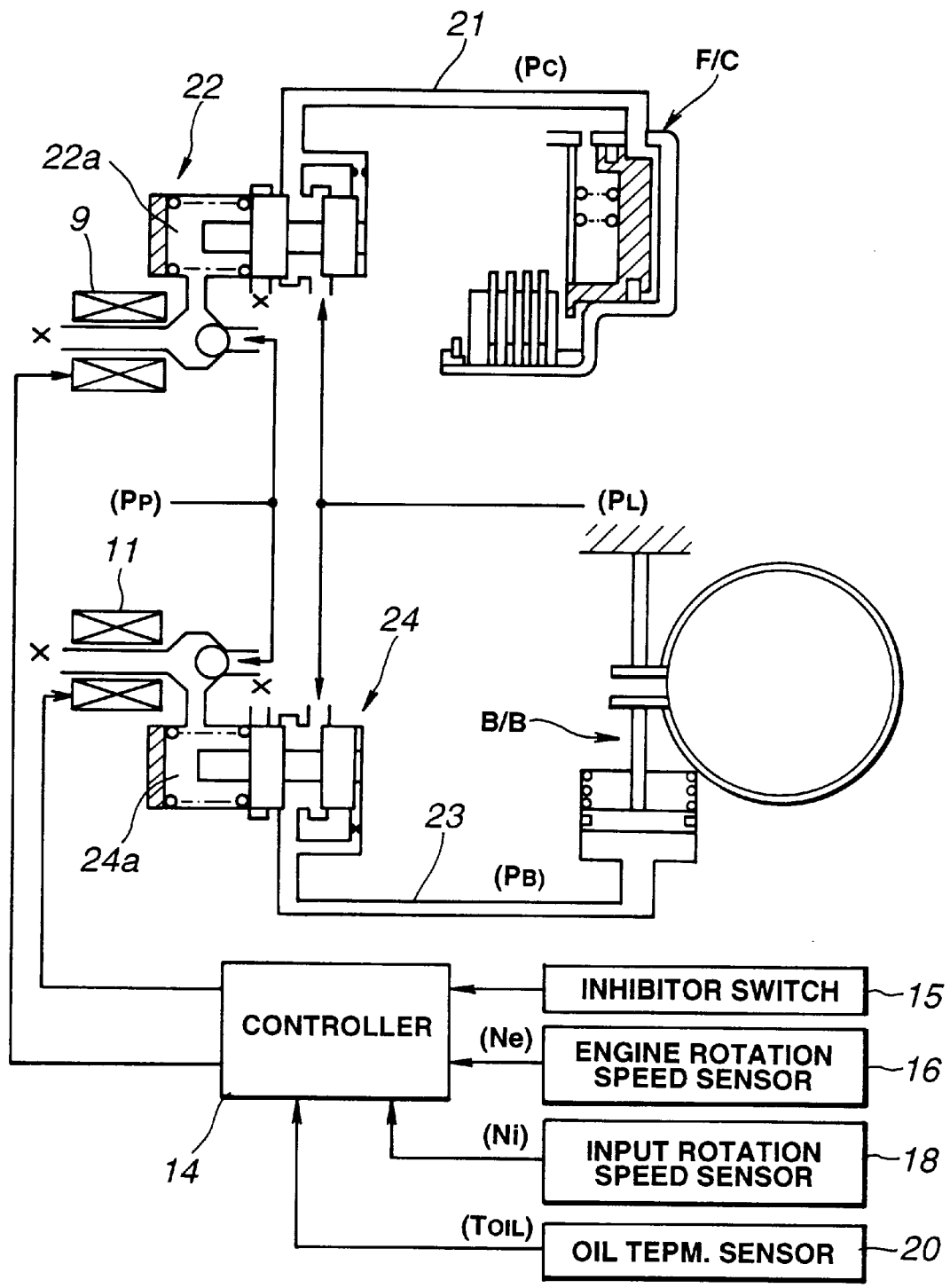
FIG. 3 is a view of a control system for controlling the N→D selection in the embodiment according to the present invention.
Figure 4:
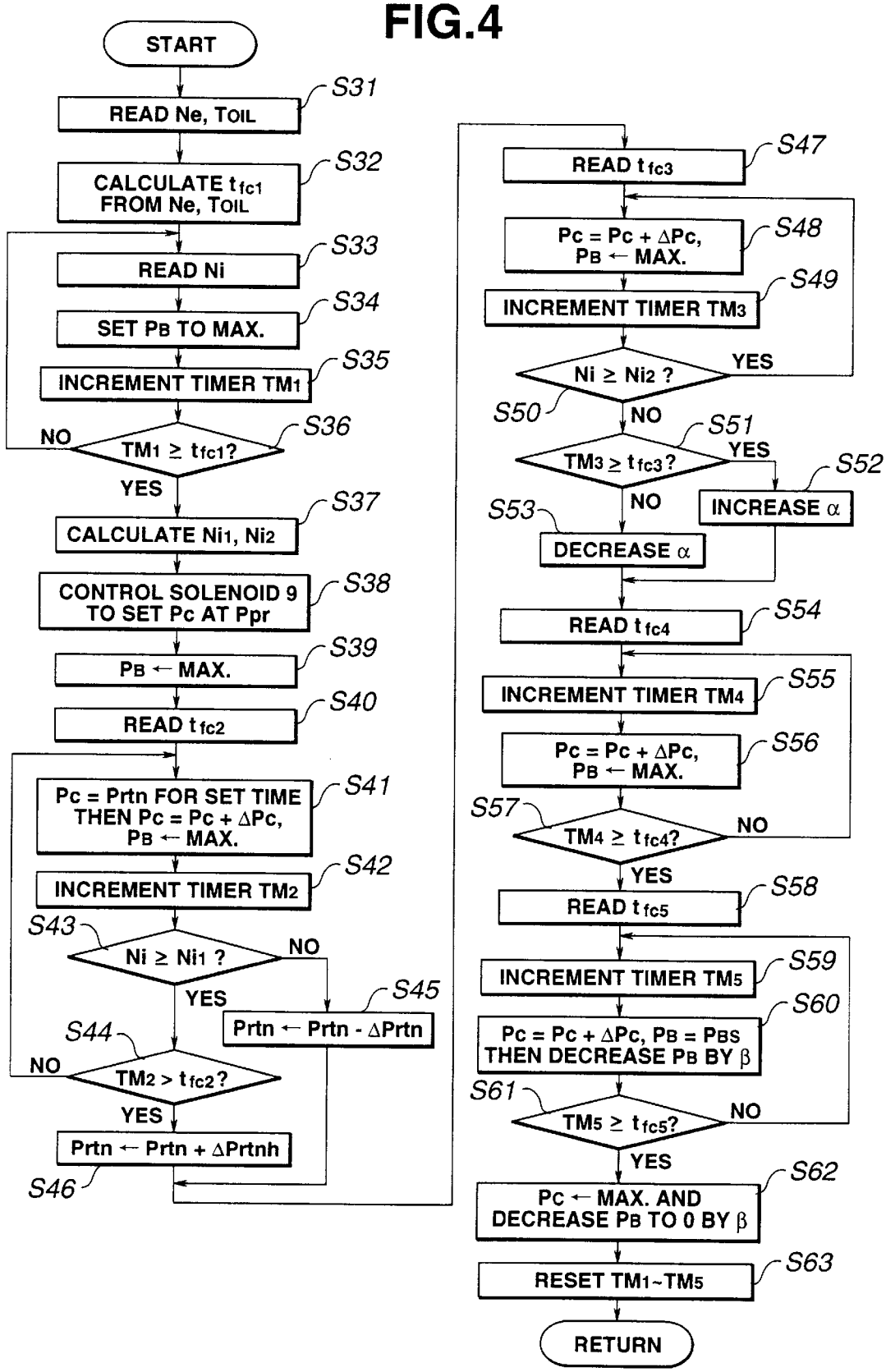
FIG. 4 is a flowchart showing the N→D select control executed by a controller.

FIG. 3 shows a partial circuit relating to the forward clutch F/C and the band brake B/B. A pressure control valve 22 is provided in a pressure control circuit 21 for the forward clutch F/C. A pressure control valve 24 is provided in a pressure control circuit 23 for the band brake B/B. The pressure control valve 22 is arranged so as to increase working pressure $P_C$ for the forward clutch F/C is according to the increase of the control pressure in a chamber 22a upon receiving the line pressure $P_L$ as a base pressure. Similarly, the pressure control valve 24 is arranged so as to increase working pressure $P_B$ for the band brake B/B is according to the increase of the control pressure in a chamber 24a upon receiving the line pressure $P_L$ as a base pressure. The control pressures in the chambers 22a and 24b are determined by the corresponding solenoids 9 and 11. These solenoids 9 and 11 respectively generate the control pressures corresponding to the duty ratios of the solenoids 9 and 11 by employing a constant pilot pressure $P_P$ generated by reducing the line pressure $P_L$. Thereupon, the generated control pressures are supplied to the chambers 22a and 24a, respectively. The controller 14 executes the duty ratio control of the solenoids 9 and 11 upon receiving the signals from the inhibitor switch 15, the engine rotation speed sensor 17, the input rotation speed sensor 18 and the oil temperature sensor 20.

When the shift position is changed from the neutral range to the drive range (N→D). The controller 14 executes the shift control as shown by the time chart of FIG. 5, based on the control program shown in FIG. 4.

First, at a step S31, the controller 14 reads the engine rotation speed $N_e$ and the transmission oil temperature $T_{OIL}$.

At a step S32, the controller 14 calculates a time period from a moment ② when the inhibitor switch 15 detects the change from N range to D range according to the shift selecting operation from N range to D range started at a moment ① to a moment ③ when the engagement pressure $P_C$ of the forward clutch F/C is increased, that is, a preset time period $T_{fc1}$ during when the engagement of the forward clutch F/C is prohibited.

Figure 6A:
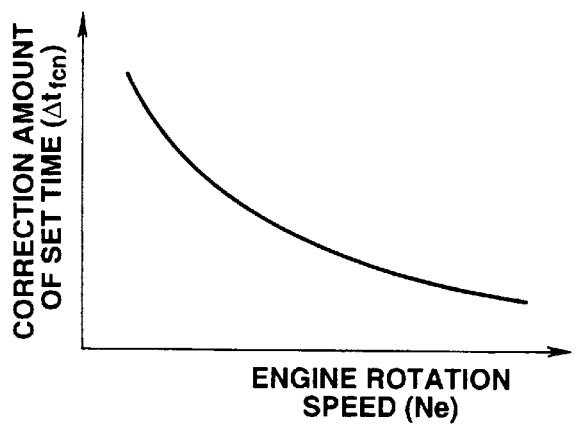
FIG. 6A is a graph showing a relationship between a correction amount of a set time and the engine rotation speed.
Figure 6B:
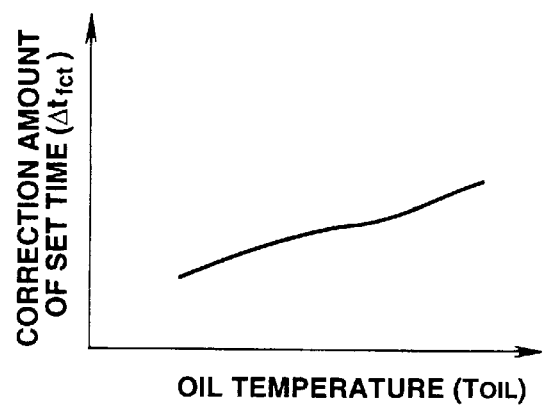
FIG. 6B is a graph showing a relationship between the correction amount of the set time and the oil temperature.

That is, the controller 14 retrieves a set time correction amount $\Delta t_{fcn}$ from a map corresponding to a graph of FIG. 6A according to the engine rotation speed $N_n$. Further, the controller 14 retrieves a set time correction amount $\Delta t_{fct}$ from a map corresponding to a graph of FIG. 6B according to the oil temperature $T_{OIL}$. The controller 14 calculates the set time period $t_{fc1}$ by adding the obtained set time correction amounts $\Delta t_{fcn}$ and $\Delta t_{fcr}$ to a set time reference amount $t_{fc0}$ ($t_{fc1} = t_{fc0} + \Delta t_{fcn} + \Delta t_{fct}$).

As is clear from FIG. 6A the set time correction amount $\Delta t_{fcn}$ is increased according to the decrease of the engine rotation speed $N_e$. Further, as is clear from FIG. 6B the set time correction amount $\Delta t_{fct}$ is increased according to the increase of the oil temperature $T_{OIL}$. Accordingly, the forward clutch engagement prohibiting time $t_{fc1}$ is increased according to the decrease of the engine rotation speed $N_e$ and the increase of the oil temperature $T_{OIL}$.

At a step S33, the controller 14 reads the input rotation speed $N_i$.

At a step S34, the controller 14 outputs a command for setting the band-brake oil pressure $P_B$ at a maximum value as same as the line pressure $P_L$.

Figure 5:
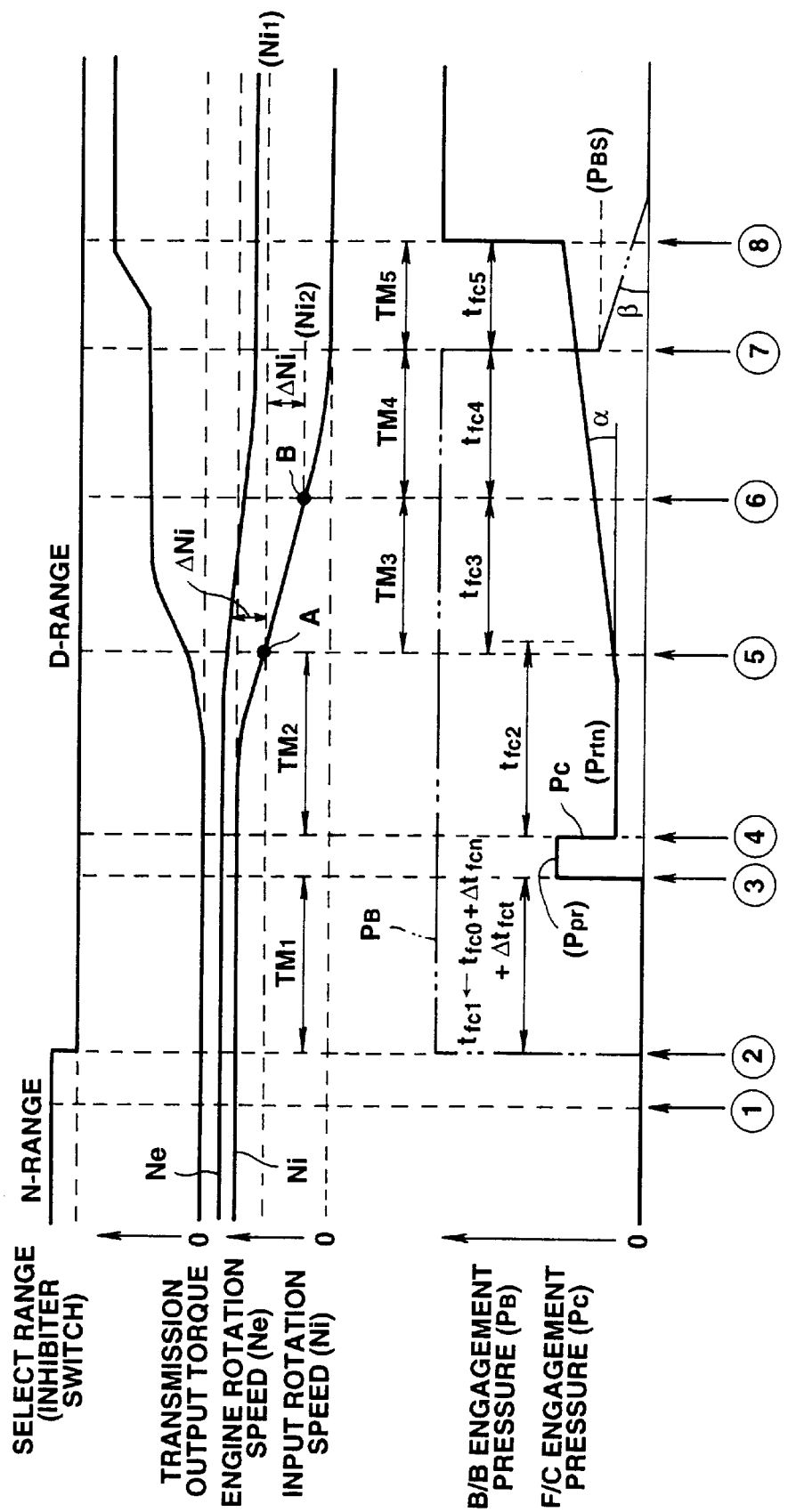
FIG. 5 is a time chart which shows changes of a transmission output shaft torque, an engine rotation speed, a transmission input rotation speed, a forward clutch working pressure, and a band brake working pressure during shifting.

At a step S35, the controller 14 increments a timer $TM_1$ to measure an elapsed time from the moment ② of FIG. 5.

At a step S36, the controller 14 decides whether or not the timer $TM_1$ is greater than or equal to the set time $t_{fc1}$. When the decision at the step S36 is NO, the routine returns to the step S33, When the decision at the step S36 is YES, the routine proceeds to a step S37. That is, the processing of the steps S33 to S35 is repeated until the timer $TM_1$ becomes greater than or equal to the set time $t_{fc1}$. Therefore, the working pressure $P_B$ of the band brake B/B is set at the maximum value during the time period from the moment ② to the moment ③ shown in FIG. 5 so as to engage only the band brake B/B during this period.

As is clear from FIG. 1, the band brake B/B does not function to directly transfer the driving force between the input and output shafts 4 and 5. Therefore, even if the working pressure $P_B$ of the band brake B/B is radically increased as shown in FIG. 5, the automatic transmission 3 never generates engagement shocks.

Since the engagement of the band brake B/B is executed by filling the empty chamber with the working pressure $P_B$ within a short time, a large quantity of oil is consumed by this operation. This temporally decreases the line pressure $P_L$. If the forward clutch F/C is engaged under this condition that the line pressure $P_L$ is temporally decreasing, a fine or delicate control required in the engagement of the forward clutch F/C cannot be executed. Accordingly, relatively large engagement shocks may be generated or a predetermined squat preventing effect may not be ensured.

According to the embodiment of the present invention, the engagement of the forward clutch F/C is prohibited during the time period from the moment ② to the moment ③ shown in FIG. 5. This prevents the above-mentioned troubles. That is, the set time period $t_{fc1}$ is adapted to a temporally lowered time of the line pressure $P_L$ caused by the engagement of the band brake B/B.

Accordingly, the set time $t_{fc1}$ is obtained by adding the set time correction amount $\Delta t_{fcn}$ by each engine rotation speed $N_e$ and the set time correction amount $\Delta t_{fcn}$ to the set time reference amount $t_{fcn}$. As is clear from FIG. 6A. the set time correction amount $\Delta t_{fcn}$ is increased according to the decrease of the engine rotation speed $N_e$, and as is clear from FIG. 6B the set time correction amount $\Delta_{fcn}$ is increased according to the increase of the oil temperature $T_{OIL}$. Therefore, the forward clutch engagement prohibiting time $t_{fc1}$ is increased according to the decrease of the engine rotation speed $N_e$ and the increase of the oil temperature $T_{OIL}$. The temporal decrease of the line pressure $P_L$ relates to a discharge capacity of an oil pump. That is, the oil discharge amount is decreased according to the decrease of the engine rotation speed $N_e$, since the oil pump is driven by the engine 1. Accordingly, the period of the temporal decrease of the line pressure $L_P$ tends to be elongated. Further, when the temperature of the working fluid of the automatic transmission 3 is high, the circulation efficiency of the working fluid is degraded by the increase of the leakage at the oil pump. This also elongates the period of the temporal decrease of the line pressure $L_P$.

That is, to elongate the forward clutch engagement prohibiting time $t_{fc1}$ according to the decrease of the engine rotation speed $N_e$ and the increased of the working oil temperature $T_{OIL}$ according to the present invention properly corresponds to the periodical change of the temporal decrease of the line pressure $P_L$. This enables the prohibiting of engagement of the forward clutch F/C to be properly executed only during the temporal decrease of the line pressure $P_L$. Therefore, this prevents the prohibiting of the engagement of the forward clutch F/C from being executed during an unnecessary time or from being unexecuted during a necessary time.

At the step S37, the controller 14 calculates a first input rotation speed set value $N_{i1}$ which is smaller than the input rotation speed $N_i$ during the forward clutch engagement prohibiting time $t_{fc1}$ by a preset amount $\Delta N_i$. Further, the controller 14 calculates a second input rotation speed set value $N_{i2}$ which is smaller than the first set value $N_{i1}$ by the preset amount $\Delta N_i$. It is preferable that the input rotation speed $N_i$ during the forward clutch engagement prohibiting time $t_{fc1}$ is an average value indicated by a wide line in FIG. 5.

At a step S38, the controller 14 controls the solenoid 9 so as to set the working pressure $P_C$ at a pre-charge pressure $P_{pr}$ by outputting a command signal to the solenoid 9. The pre-charge pressure $P_{pr}$ is a value at which a loss stroke of the forward clutch F/C is radically finished. The output of the command signal is continued for a time period from the moment ② to the moment ④ in FIG. 5 so as to rapidly loss-stroke the forward clutch F/C by setting the forward clutch working pressure $P_C$ at the pre-charge pressure $P_{pr}$ during the set time period.

At a step S39, the controller 14 controls the solenoid 11 so as to set the working pressure $P_B$ of the band brake B/B at the maximum value (the line pressure PL), during the period from the moment ③ to the moment ④ so as to fully engage the band brake B/B by outputting the command signal to the solenoid insert 11.

At a step S40 processed at the moment ④ of FIG. 5, the controller 14 reads an upper limit value $t_{fc2}$ of an allowable time period during when the input rotation speed $N_i$ is decreased to the first preset rotation speed $N_{i1}$ at the step S37 by the slipping engagement of the forward clutch F/C.

At a step S41, the controller 14 controls the solenoid 9 so as to establish the slipping engagement of the forward clutch F/C. More particularly, the controller 14 outputs a command signal to the solenoid 9 for a preset time so as to set the working pressure $P_C$ to a return spring corresponding pressure (an initial set pressure) $P_{rtn}$ corresponding to the force of a return spring. Then, the controller 14 outputs a command signal to the solenoid 9 to increase the working pressure $P_C$ by a correction amount $\Delta P_C$ in order to linearly increase the working pressure $P_C$ of the forward clutch by a slope $\alpha$. By this operation, the engagement of the forward clutch F/C is proceeded. Further, the controller 14 outputs a command signal to the solenoid 11 so as to set the working pressure $P_B$ of the band brake B/B to a maximum value.

At a step S42, the controller 14 increments the timer $TM_2$ so that an elapsed time from the moment ④ is measured.

At a step S43, the controller 14 decides whether or not the input rotation speed $N_i$ is greater than or equal to the first preset rotation speed $N_{i1}$. That is, it is decided whether or not the timing does not reach the point A in FIG. 5. When the decision at the step S43 is YES, the routine proceeds to a step S44. When the decision at the step S43 is NO, that is, when the timing reaches the point A in FIG. 5, the routine proceeds to a step S45.

At the step S44, the controller 14 decides whether or not the timer $TM_2$ is greater than the upper limit value $t_{fc2}$. When the decision at the step S44 is NO, the routine returns to the step S41 such that the working pressure $P_C$ of the forward clutch F/C is increased by the slope $\alpha$ and the working pressure $P_B$ of the band brake B/B is maintained at the maximum value after the working pressure $P_C$ is maintained at the pressure $P_{rtn}$ for the predetermined time, as far as the timing does not reach the point A and the timer $TM_2$ is smaller than the upper limit $t_{fc2}$. When the decision as the step S44 becomes YES, the routine proceeds to a step S46.

Figure 7:
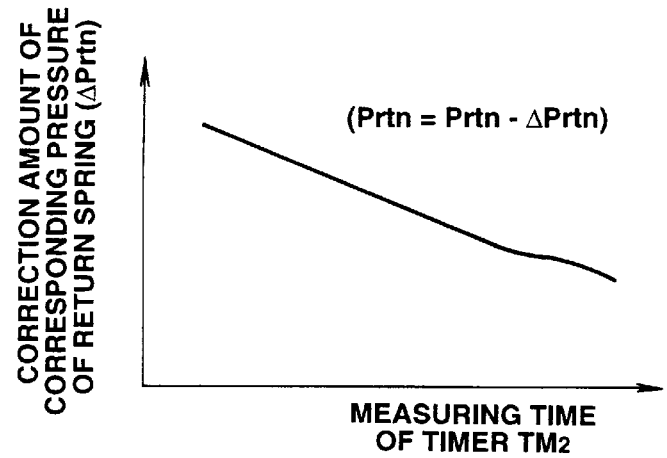
FIG. 7 is a graph showing a relationship between a correction amount of a return spring corresponding pressure and a timer $TM_2$.

At the step S45 following to the NO decision in the step S43, the controller 14 retrieves a correction amount $\Delta P_{rtn}$ corresponding to the force of the return spring from a map corresponding to a graph of FIG. 7 on the basis of a measured time of the timer $TM_2$ at the moment ⑤, and decreases the pressure $P_{rtn}$ by the selected correction amount $\Delta P_{rtn}$, such that pressure $P_{rtn}$ is used in the shifting operation when next the shift position is changed from the neutral position to the forward position (N→D). The correction amount $\Delta P_{rtn}$ is increased according to the elongation of the time period $TM_2$ between the moments ④ and ⑤. Therefore, the learning control of the return spring corresponding pressure $P_{rtn}$ is executed in high speed and has a superior convergence characteristic so as to converge the corrected pressure $P_{rtn}$ within the time period $TM_2$ between the moments ④ and ⑤. Following to the step S45, the routine proceeds to a step S47.

At the step S46 following to the YES decision in the step S44, the controller 14 increases the return spring corresponding pressure $P_{rtn}$ by a predetermined correction amount $\Delta P_{rtnh}$ in order to adopt it in the shifting when the shift position is next changed from the N-range to the D-range. Then, the routine proceeds to the step S47.

The increase correction amount $\Delta P_{rtnh}$ is set at a constant value which is larger than the correction amount $\Delta P_{rtn}$. Therefore, a condition that the input rotation speed $N_i$ is not decreased for a long time period greater than the allowable upper limit value $t_{fc2}$ is rapidly solved.

At the step S47 executed at a moment ⑤ of FIG. 5, the controller 14 reads a target time period $t_{fc3}$ relating to a time period from the moment ⑤ to a moment ⑥ of FIG. 5, wherein at the moment ⑤ the input rotation speed $N_1$ is decreased to the first preset rotation speed $N_{i1}$, and at the moment ⑥ the input rotation speed $N_i$ is decreased to the second present rotation speed $N_{i2}$. The time period between the moments and ⑤ and ⑥ is the time period necessary that the engine rotation speed $N_1$ is decreased from the point A to the point B on the line indicative of the input rotation speed $N_1$ in FIG. 5.

At the step S48, the controller 14 controls the solenoid 9 so as to increase the working pressure $P_C$ by the correction amount $\Delta P_C$ in order to increase the working pressure $P_C$ of the forward clutch F/C by the slope $\alpha$, and simultaneously the controller 14 controls the solenoid 11 so as to set the working pressure $P_B$ of the band brake B/B at the maximum value.

At a step S49, the controller 14 increments the time $TM_3$ so that an elapsed time from the moment ⑤ is measured.

At a step S50, the controller 14 decides whether or not the input rotation speed $N_i$ is greater than or equal to the second preset rotation speed $N_{i2}$. Therefore, the working pressure $P_C$ of the forward clutch F/C is increased by the slope $\alpha$, and simultaneously the working pressure $P_B$ of the band brake B/B is maintained at the maximum value. When the decision at the step S50 is YES, the routine returns to the step S48 to continue the processing executed at the steps S48 and S49. When the decision at the step S50 is NO, that is, when the controller 14 decides that the input rotation speed $N_i$ becomes smaller than the second preset rotation speed $N_{i2}$, the routine proceeds to a step S51.

At the step S51, the controller 14 decides whether or not the measured value of the timer $TM_3$ is greater than or equal to the target time $t_{fc3}$, wherein the measured value is represented by the reference mark $TM_3$. That is, it is decided whether or not the time period consumed to decrease the input rotation speed $N_i$ from the first set rotation speed $N_{i1}$ to the second preset rotation speed $N_{i2}$ is greater than or equal to the target time $t_{fc3}$. When the decision at the step S51 is YES, the routine proceeds to a step S52, When the decision at the step S51 is NO, the routine proceeds to a step S53.

At the step S52 following to the YES decision at the step S51, the controller 14 increases the slope $\alpha$ to be used in the next routine by incrementing the increased correction amount $\Delta P_C$ used in the step S41 and S48 in the next routine by a predetermined amount so as to decrease the time period consumed to decrease the input rotation speed $N_i$ form the first set rotation speed $N_{i1}$ to the second set rotation speed $N_{i2}$. Then, the routine proceeds to a step S54.

At the step S53, the controller 14 decreases the slope $\alpha$ to be used in the next routine by decrementing the increased correction amount $\Delta P_C$ used in the step S41 and S48 in the next routine by a predetermined amount so as to decrease the time period consumed to decrease the input rotation speed $N_i$ from the first set rotation speed $N_{i1}$ to the second set rotation speed $N_{i2}$. Then, the routine proceeds to the step S54. By the processing executed in the steps S51, S52 and S53, the slope $\alpha$ shown in FIG. 5 is controlled by the learning control such that the time period consumed to decrease the input rotation speed $N_i$ from the first set rotation speed $N_{i1}$ to the second set rotation speed $N_{i2}$ approaches the target time $t_{fc3}$.

At the step S54 executed at the moment ⑥ in FIG. 5, the controller 14 reads a preset time $t_{fc4}$ which corresponds to a time period consumed to decrease the input rotation speed $N_i$ from the second set rotation speed $N_{i2}$ at the moment ⑥ to zero at which the engagement of the forward clutch F/C is completed.

At a step S55, the controller 14 increments a timer $TM_4$ such that an elapsed time from the moment ⑥ is measured.

At a step S56, the controller 14 controls the solenoid 9 so as to increase the working pressure $P_C$ by the correction amount $\Delta P_C$ of the present routine in order to increase the working pressure $P_C$ of the forward clutch F/C by the slope $\alpha$, and simultaneously the controller 14 controls the solenoid 11 so as to set the working pressure $P_B$ of the band brake B/B at the maximum value.

At a step S57, the controller 14 decides whether or not a timer $TM_4$ is greater than or equal to a time period $t_{fc4}$ between the moments ⑥ and ⑦ in FIG. 5. When the decision at the step S57 is NO, the routine returns to the step S55. That is, during the time period $t_{fc4}$ the working pressure $P_C$ of the forward clutch F/C is increased by the slope $\alpha$, and the working pressure $P_B$ of the band brake B/B is maintained at the maximum value. When the decision at the step S57 is YES, the routine proceeds to a step S58.

At the step S58, the controller 14 reads a preset time $t_{fc5}$ to be consumed for an engagement changing control that the engagement of the forward clutch F/C is proceeded and the band brake B/B is disengaged.

At a step S59, the controller 14 increments a timer $TM_5$ such that an elapsed time from the moment ⑦ is measured.

At a step S60, the controller 14 controls the solenoid 9 so as to increase the working pressure $P_C$ by the correction amount $\Delta P_C$ of the present routine in order to increase the working pressure $P_C$ of the forward clutch F/C by the slope $\alpha$, and simultaneously the controller 14 controls the solenoid 11 so as to quickly decrease the working pressure $P_B$ of the band brake B/B to an engagement limit pressure $P_{B5}$ at which the band brake B/B is set in a condition just before starts slipping. Then, the controller 14 controls the solenoid 11 so as to decrease the working pressure $P_B$ of the band brake B/B by a predetermined slope $\beta$. The engagement limit pressure $P_{B5}$ is a value corresponding to the transmission input torque calculated from a well-known torque converter characteristic curve on the basis of a speed ratio of the torque converter 2 represented by a ratio between the engine rotation speed $N_e$ and the input rotation speed $N_i$. The slope $\beta$ of the band brake working pressure $P_B$ is determined according to the input torque. By this processing, the disengagement of the band brake B/B is smoothly executed without generating shocks.

At a step S61, the controller 14 decides whether or not a timer $TM_5$ is greater than or equal to a preset time $t_{fc5}$ between the moments ⑦ and ⑧ in FIG. 5. When the decision at the step S61 is NO, the routine returns to the step S59 to repeat the steps S59 and S60. That is, during the time period $t_{fc5}$ the working pressure $P_C$ of the forward clutch F/C is increased by the slope $\alpha$, and the working pressure $P_B$ of the band brake B/B is quickly decreased to the engagement limit pressure $P_{B5}$ and is then decreased by the slope $\beta$. When the decision at the step S61 is YES, the routine proceeds to a step S62.

At the step S62, the controller 14 controls the solenoid 9 to quickly increase the working pressure $P_C$ of the forward clutch F/C to the maximum value (the line pressure) and simultaneously controls the solenoid 11 to decrease the working pressure $P_B$ of the band brake B/B to zero by the slope $\beta$.

At a step S63, the controller 14 resets the timers $TM_1$ to $TM_5$ to zero for the next routine. Then, the routine returns to the start.

With thus arranged shift control during N→D select shown by the flowchart of FIG. 5, the second speed gear is selected by the engagement of the band brake B/B and the engagement of the forward clutch F/C. Thereafter, the first speed gear is selected by engaging only the forward clutch F/C. Accordingly, the output torque is increased step by step from zero through a small value determined by the reduction ratio of the second speed to a value of the first speed as shown by the output torque curve of FIG. 5. This suppresses the squat or shift shocks caused by directly selecting the first speed from the neutral range.

During this period, the band brake B/B is first engaged by increasing the working pressure $P_B$ at the moment ②. Then, the engagement of the forward clutch F/C is proceeded by increasing the working pressure $P_C$ from the moment ③ such that the second speed gear is selected during the time period between the moments ⑤ and ⑦. Further, thereafter, the first speed gear is selected by disengaging the band brake B/B during the period between the moments ⑦ and ⑧. Accordingly, it becomes possible to ensure the procedures of the engagement of the band brake B/B, the selection of the second speed gear by the engagement of the forward clutch F/C and the selection of the first speed by the disengagement of the band brake B/B. This prevents troubles such that the striking noise between gears is generated by the direct engagement of the forward clutch F/C for the direct selection of the first speed gear before the engagement of the band brake B/B.

When the working pressure $P_B$ is supplied to the band brake B/B for the purpose of the shift control during N to D selection, it is necessary to complete the pressure supply operation within a short time since the band brake B/B is first put in an empty condition. Therefore, the line pressure $P_L$ which is a base pressure of the automatic transmission is temporally decreased by the consumption of the working oil. Therefore, under this temporal pressure lowered condition, it is difficult to finely increase the working pressure $P_C$ of the forward clutch F/C like as the control during the moments ③ and ⑧. Therefore it is impossible to suppress the squat and shifting shock without the fine working pressure control since the forward clutch F/C executes the power transmission.

Therefore, the shift control apparatus according to the present invention is arranged such that the engagement of the forward clutch F/C is prohibited for a time period $t_{fc1}$ from the moment ② starting the N→D selection to the moment ③, the forward clutch F/C is not engaged during the period when the line pressure $P_L$ is largely decreased in a manner that the supply of the working pressure $P_C$ is prohibited. This solves the problem such that the squat preventing effect and the shift shock suppressing effect, which are ensured by the fine pressure control of the working pressure $P_C$, can not be ensured by supplying the working pressure $P_C$ under the condition that the line pressure $P_L$ is temporally decreased.

Furthermore, the shift control apparatus according to the present invention is arranged such that the set time $t_{fc1}$ for prohibiting the engagement of the forward clutch F/C is elongated according to the decrease of the rotation speed of the oil pump and the increase of the temperature $T_{OIL}$ of the working oil. This arrangement properly corresponds to the fact that the line pressure lower time is elongated by the decrease of the discharge amount of the oil pump and is elongated by the degradation of the oil circulating efficiency due to the oil leakage caused by the increase of the oil temperature $T_{OIL}$. Accordingly, it becomes possible to accurately adjust the prohibiting set time $t_{fc1}$ to the line pressure temporally lowered period. This avoids the problems such that the above-mentioned effects can not be ensured by the delay of the shift change during N→D select or un-execution of the engagement of the forward clutch caused by the discorresponding of the prohibiting set time.

Furthermore, according to shift control apparatus of the present invention, in case that the working pressure $P_C$ is first pre-charged at the pre-charge pressure $P_{pr}$, and is second set at the return spring corresponding pressure $P_{rm}$ which is an initial set pressure, and is third increased by the slope α for the engagement of the forward clutch F/C; when the time period $TM_2$ is smaller than the preset time $t_{fc2}$ wherein the time period $TM_2$ is a period from the moment ④ for commanding to set the forward clutch working pressure $P_C$ at the return spring pressure $P_{rm}$ to the moment ⑤ when the input rotation speed $N_i$ is decreased by the preset amount $\Delta N_i$, the return spring corresponding pressure $P_{rm}$ is decreased by a correction amount $\Delta P_{rm}$. When the time period $TM_2$ is greater than the preset time $t_{fc2}$, the return spring corresponding pressure $P_{rm}$ is increased by the correction amount $\Delta P_{rmh}$. Accordingly, it becomes possible to always maintain the preset time period $t_{fc2}$ at a proper value by executing the learning control of the return spring corresponding pressure $P_{rm}$ such that the preset time period $t_{fc2}$ is achieved.

Additionally, when the time period $TM_3$ between the moments ⑤ and ⑥ in FIG. 5 is longer than the preset time $t_{fc3}$ wherein the time period $TM_3$ is a period from the moment ⑤ when the input rotation speed $N_i$ is decreased by the preset amount $\Delta N_i$ to the moment ⑥ when the input rotation speed $N_i$ decreased by the preset amount $\Delta N_i$ is further decreased by the preset amount $\Delta N_i$, the slope α of the working pressure $P_C$ of the forward clutch F/C is increased. When the time period $TM_3$ is shorter than the preset time $t_{fc3}$, the slope α of the working pressure $P_C$ of the forward clutch F/C is decreased. Therefore, it becomes possible to always maintain the preset time period $t_{fc3}$ at a proper value by executing the learning control of the slope α of the working pressure $P_C$ such that the preset time period $t_{fc3}$ is achieved.

What is claimed is:

1. A shift control apparatus used in an automatic transmission which establishes a plurality of shift speed gear by selectively engaging a plurality of friction elements, said shift control apparatus comprising:

first speed gear selecting means for selecting a first speed gear after selecting a higher speed gear when a shift range of the automatic transmission is changed from a neutral range in which all friction elements are disengaged to a forward range in which one of the plurality of speed gears is selectable, said first speed gear selecting means executing the selection of the first speed gear in such a manner that first the friction element, which relates to select the higher speed gear and does not execute the transmission of drive power of an engine independently, is engaged, second the friction element, which relates to select the first speed gear, and third the friction element which relates to select the higher speed gear, is disengaged; and engagement prohibiting means for prohibiting the engagement of the friction element for selecting the first speed gear for a predetermined prohibiting time period from the moment when the shift range is changed from the neutral range to the forward range.

2. A shift control apparatus as claimed in claim 1, wherein the predetermine time period employed in said engagement prohibiting means is increased according to the decrease of a rotation speed of an oil pump for the automatic transmission.

3. A shift control apparatus as claimed in claim 1, wherein the predetermine time period employed in said engagement prohibiting means is increased according to the increase of temperature of working oil for the automatic transmission.

4. A shift control apparatus as claimed in claim 1, wherein in case that the engagement pressure of the friction element for selecting the first speed gear is first set at an initial set pressure and is then increased by a preset slope in order to engage the friction element for selecting the first speed gear, when a time period, from a moment when a command for setting the engagement pressure of the first speed selecting friction element is outputted to a moment when the input rotation speed of the automatic transmission becomes smaller by a preset value than an input rotation speed during a period for prohibiting the engagement of the first speed selecting friction element, is shorter than a preset time period, the initial set pressure of the first speed friction element is decreased.

5. A shift control apparatus as claimed in claim 1, wherein in case that the engagement pressure of the friction element for selecting the first speed is first set at an initial set pressure and is then increased by a preset slope in order to engage the friction element for selecting the first speed, when a time period, from a moment when a command for setting the engagement pressure of the first speed selecting friction element is outputted to a moment when the input rotation speed of the automatic transmission becomes smaller by a preset value than an input rotation speed during a period for prohibiting the engagement of the first speed selecting friction element, is longer than a preset time, the initial set pressure of the first speed friction element is increased.

6. A shift control apparatus as claimed in claim 1, wherein in case that the engagement pressure of the friction element for selecting the first speed is first set at an initial set pressure and is then increased by a preset slope in order to engage the friction element for selecting the first speed, when a time period, from a moment when the input rotation speed of the automatic transmission is decreased by a predetermined amount from the input rotation speed during the predetermined prohibiting time period to a moment when the input rotation speed is further decreased by the predetermined amount, is longer than a preset time period, the preset slope being increased.

7. A shift control apparatus as claimed in claim 1, wherein in case that the engagement pressure of the friction element for selecting the first speed is first set at an initial set pressure and is then increased by a preset slope in order to engage the friction element for selecting the first speed, when a time period, from a moment when the input rotation speed of the automatic transmission is decreased by a predetermined amount from the input rotation speed during the predetermined prohibiting time period to a moment when the input rotation speed is further decreased by the predetermined amount, is shorter than a preset time period, the preset slope being decreased.

8. A shift control apparatus used in an automatic transmission which establishes a plurality of shift speed gear by selectively engaging a plurality of friction elements, said shift control apparatus, comprising:

a plurality of sensing devices detecting operating conditions of the automatic transmission and an engine connected to the automatic transmission through a torque converter; and a controller arranged such that when the shift range is changed from a neutral range in which all friction elements are disengaged to a forward range in which one of the plurality of shift speeds is selectable, a first speed gear is selected after a higher speed gear is first selected in a manner that the friction element, which relates to establish the higher speed gear and does not execute the transmission of drive power independently, is first engaged, the friction element, which relates to establish the first speed gear, then the friction element relating to establish the higher speed gear is disengaged, said controller being arranged to prohibit the engagement of the friction element relating to establish the first speed gear for a predetermined prohibiting time period from a time when the shift range is changed from the neutral range to the forward range, the predetermined prohibiting time period being changed according to signals from said sensing devices.

9. A shift control apparatus as claimed in claim 8, wherein said sensing devices includes an engine rotation speed sensor which outputs a signal indicative of a rotation speed of an oil pump for the automatic transmission, the predetermined prohibiting time period being increased according to the decrease of the signal from the engine rotation speed sensor.

10. A shift control apparatus as claimed in claim 8, wherein said sensing devices includes an oil temperature sensor which outputs a signal indicative of a temperature of working oil of the automatic transmission, the predetermined prohibiting time period being increased according to the increase of the signal from the oil temperature sensor.

11. A shift control apparatus as claimed in claim 8, wherein said controller is arranged such that the engagement pressure of the friction element for selecting the first speed gear is first set at an initial set pressure and is then increased by a preset slope in order to engage the friction element for selecting the first speed gear.

12. A shift control apparatus as claimed in claim 11, wherein said controller is arranged to change the initial set pressure of the first speed selecting friction element according to a time period, from a moment when a command for setting the engagement pressure of the first speed selecting friction element is outputted to a moment when the input rotation speed of the automatic transmission becomes smaller by a preset value than an input rotation speed during a period for prohibiting the engagement of the first speed selecting friction element.

13. A shift control apparatus as claimed in claim 11, wherein said controller is arranged to change the preset slope according to a time period from a moment when the input rotation speed of the automatic transmission is decreased by a predetermined amount from the input rotation speed during the predetermined prohibiting time period to a moment when the input rotation speed is further decreased by the predetermined amount.

* * * * *